United States Patent

[11] 3,595,097

| [72] | Inventor | Kumakichi Araya |
| | | No. 2, Daishoji Seki-machi, Kaga-shi, Ishikawa-Prefecture, Japan |
| [21] | Appl. No. | 838,181 |
| [22] | Filed | July 1, 1969 |
| [45] | Patented | July 27, 1971 |
| [32] | Priority | Feb. 24, 1969 |
| [33] | | Japan |
| [31] | | 44-13218 |

[54] CHAIN INCLUDING LINK PLATES HAVING SWAGED PORTIONS
5 Claims, 8 Drawing Figs.

[52] U.S. Cl. ............................................. 74/250
[51] Int. Cl. ............................................. F16g 13/02
[50] Field of Search ........................................ 74/245, 250, 251, 255, 256

[56] References Cited
UNITED STATES PATENTS

| 278,482 | 5/1883 | Angell | 74/255 |
| 617,137 | 1/1899 | Anthony | 74/255 |
| 1,293,835 | 2/1919 | McGowan | 74/251 |
| 1,421,178 | 6/1922 | Davis | 74/255 X |
| 1,881,631 | 10/1932 | Jewett | 74/251 X |
| 2,329,303 | 9/1943 | Stewart | 74/250 UX |
| 2,391,485 | 12/1945 | Simmons | 74/250 X |
| 3,359,815 | 12/1967 | Jeffrey | 74/250 |

FOREIGN PATENTS

| 564,248 | 10/1923 | France | 74/245 |

*Primary Examiner*—C. J. Husar
*Attorneys*—Robert E. Burns and Emmanuel J. Lobato ABSTRACT: This invention relates to a link plate of chain provided with swaged portions of substantial thickness formed around each opening for inserting a pivot pin or a bushing for mounting a sleeve roller in one side thereof in order to obtain an improved press fit between the link and the pivot pin or the bushing.

PATENTED JUL 27 1971　　3,595,097

CHAIN INCLUDING LINK PLATES HAVING SWAGED PORTIONS

DESCRIPTION OF THE PRIOR ART

In operation of roller chains and the like which are widely used for conveyor systems in workshops, factories and warehouses, and for power transmission systems on vehicles, the portion of the chain in mesh with a sprocket will be flexed through a rotational movement of the bushing secured on a roller link plate relative to the pivot pin secured on a pin link plate. At this time, there will be a mutual rubbing contact between the bushing and the pivot pin, thereby producing a rotating movement of the roller link plate with reference to the pin link plate. When the roller link plate, the pin link plate, the pivot pin and the bushing are worn down respectively, there will be produced an unnecessary gap between each members, which gap tends to develop a breakdown or disassembling of the chain in worst case. Therefore, it is necessary to completely secure the pivot pin and the bushing on the pin link plate and roller link plate respectively. However, if a press fitting is improperly effected between the above-mentioned members, the opening on the plates, will be destroyed, damaged or deformed, thus reducing the efficiency of press fit connection.

SUMMARY OF THE INVENTION

The present invention relates to a link plate of chain and, more particularly, to a link plate of chain having swaged portions formed around each opening for inserting a pivot pin or a bushing for mounting a sleeve roller.

A principal object of the present invention is to provide a method of securing the pivot pin onto the pin link plate of the chain firmly.

Another object of the present invention is to provide a method of firmly securing the pivot pin or the bushing onto the pin link plate or the roller link plate of the chain respectively without causing any fracture or damage of the pivot pin or the area surrounding the opening of the link plates.

Still another object of the present invention is to provide plate members intended for pin link plates or roller link plates of the chain which are rugged, inexpensive and simple in construction.

According to the present invention, there is provided a chain having integral swaged portions of substantial thickness formed around opening provided in pin link plates and roller link plates. The swaged portions of adjacent pin and roller link plates each project outwardly in the same direction.

DESCRIPTION OF THE PREFERRED EMBODIMENT

Referring more particularly to the drawings, the preferred embodiment of the present invention will now be described.

Figure 1:
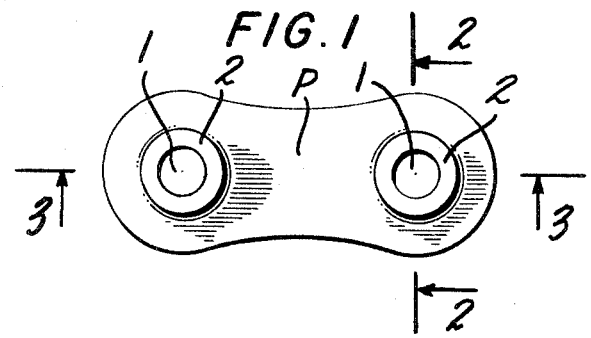
FIG. 1 is a top plan view showing the link plate according to the present invention.
Figure 2:
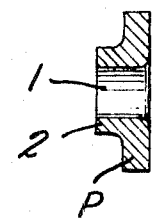
FIG. 2 is a cross-sectional view taken along a line II–II in FIG. 1.
Figure 3:
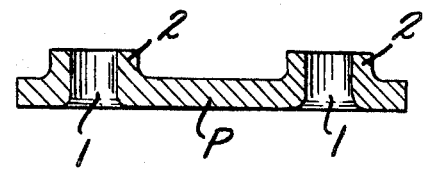
FIG. 3 is a longitudinal sectional view taken along a line III–III in FIG. 1.

FIG. 1 shows a flat plat P which is intended for a pin or a roller link plate and which is provided with swaged portions 2 surrounding openings 1 perforated through the flat plate at both ends thereof and protruding from one side of the same. The swaged portion 2 is formed by a process of plastic shaping.

Figure 4:
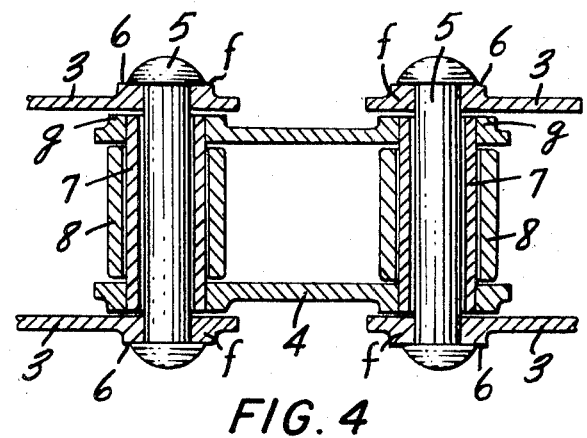
FIG. 4 is a longitudinal sectional view showing portion of chain in assembled condition.

As shown in FIG. 4, the chain is assembled by placing one pair of pin link plates 3 over a pair of roller link plates 4 with the swaged tubular portions $f$, $g$ extending outwardly from their respective link plates in the same direction and being overlapped one above the other. Then a pivot pin 5 is inserted into aligned openings provided in both link plates and both ends of the pivot pin 5 are peened over the end 6 of swaged portions $f$ of the pin link plate 3. Both ends of a bushing 7 are secured to the inside of swaged portions $g$ of the roller link plate 4 and then a sleeve roller 8 is loosely mounted over the bushing 7.

Figure 5A:
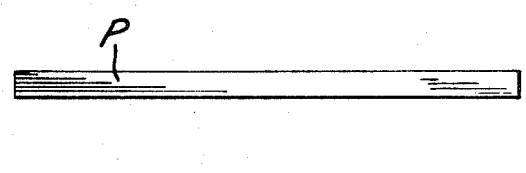
FIG. 5a, 5b, 5c are views showing the sequential steps of forming a link plate according to the present invention.
Figure 5B:
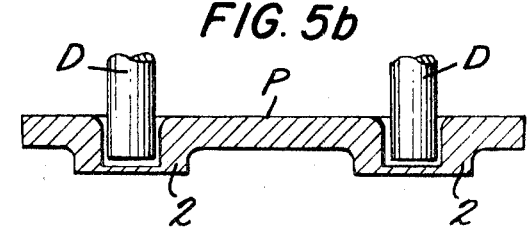
Figure 5C:
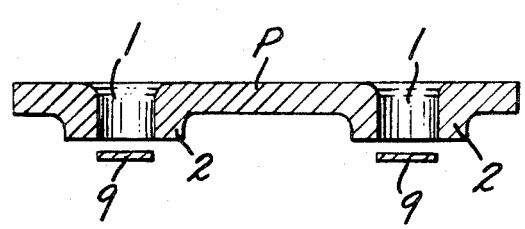
Figure 6:
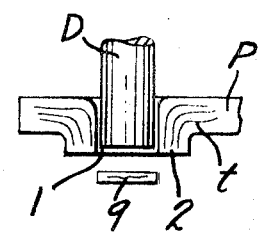
FIG. 6 is a view showing a fibrous structure of metallic material forming the link plate according to the present invention.

As shown in FIG. 5, in a process of forming the link plate according to the present invention, two openings 1, 1 are formed through the flat plate P adjacent both ends thereof by applying suitable dies D, D thereon, and then swaged portions 2 are formed on the flat plate P in the peripheral area of both openings 1,1 by a process of plastic shaping. At this time, the fibrous structure of the flat plate P will have an orientation as shown by $t$ in FIG. 6. In FIG. 5c is shown a piece of wasted material 9 removed at the time of perforating operation by means of the die D.

Since both link plates are constructed as shown hereinabove according to the present invention, the pivot pin 5 and the bushing 7 may be more efficiently press fitted into the pin link plate 3 and the roller link plate 4 respectively by increasing the contact area between the pivot pin 5 and the pin link plate 3, and that between the bushing 7 and the roller link plate 4 by means of the presence of the tubular swaged portions 2. Also stress concentrations will be prevented from rising to a maximum value in the peripheral area of each opening 1 during the service of chain. Simultaneously, since the pivot pin 5 and the bushing 7 are prevented from fracture and damage and the strength of the link plates is increased, chains of lighter construction may be used without difficulties when subjected to load equivalent to that of the prior art chain. Since wear of the pivot pin and the bushing is reduced by increasing the contact area between the pivot pin 5 and the pin link plate 3 as well as that between the bushing 7 and the roller link plate 4, the life of the whole chain will be increased, thus rendering the chain economical to users. Since the chain of the present invention is simple to construct, rugged and inexpensive link plates may be provided to the consumers. Since the fibrous structure $t$ of the metallic material is preserved without destruction, the link plate will have a strength greater than that of the flat plate having a punched hole.

What I claim is:

1. A chain comprising: pin link plates and roller link plates each having means defining openings therethrough and having a swaged portion formed around each opening on one side thereof, said swaged portions being provided outwardly of each end of roller members and projecting out in the same direction and overlapped one above the other on said pin link plates and roller link plates, and pin members having shank portions thereof passing through said openings peened over said swaged portions on said pin link plates at both ends thereof.

2. A chain as claimed in claim 1 wherein the fibrous structure of the material constituting said pin link plates and roller link plates is orientated continuously from the flat plate portion thereof to said swaged portion thereof.

3. A chain assembly comprising: a plurality of pairs of oppositely spaced-apart pin link plates; a plurality of pairs of oppositely spaced-apart roller link plates; each link plate having an elongated configuration and having means therein defining an opening at each end thereof and having a tubular portion surrounding each opening extending outwardly away from a longitudinal center axis of the chain assembly; individual pairs of said pin link plates being positioned in alternate end-to-end relationship with individual pairs of said roller link plates whereby the openings provided in the end portion of the adjacent roller link plates; connecting means including a pin extending through each set of aligned opening alternately connecting together in end-to-end relationship individual pairs of said pin link plates to individual pairs of said roller link plates; and a tubular roller rotatably disposed around each said pin.

4. A chain assembly according to claim 3; wherein the end portion of each pair of roller link plates is positioned interiorly of the end portion of the pin link plates to which it is connected.

5. A chain assembly according to claim 3; including tubular connecting means disposed between each end of each said pair of roller link plates connecting same together, and wherein said pins extend interiorly of said tubular connecting means and said tubular rollers are rotatably disposed exteriorly of said tubular connecting means.